United States Patent
Lee et al.

(10) Patent No.: US 12,457,568 B2
(45) Date of Patent: Oct. 28, 2025

(54) METHOD OF POWER CONTROL, REPEATER AND STORAGE MEDIUM

(71) Applicant: Morelink Technology Corporation, Taipei (TW)

(72) Inventors: Yung-ting Lee, Taipei (TW); Chunn-yenn Lin, Taipei (TW)

(73) Assignee: Morelink Technology Corporation, Taipei (TW)

( * ) Notice: Subject to any disclaimer, the term of this patent is extended or adjusted under 35 U.S.C. 154(b) by 330 days.

(21) Appl. No.: 18/236,964

(22) Filed: Aug. 23, 2023

(65) Prior Publication Data

US 2024/0072883 A1 Feb. 29, 2024

Related U.S. Application Data

(60) Provisional application No. 63/401,112, filed on Aug. 25, 2022.

(51) Int. Cl.

| | |
|---|---|
| *H04W 52/52* | (2009.01) |
| *H04B 7/155* | (2006.01) |
| *H04W 24/08* | (2009.01) |
| *H04W 52/24* | (2009.01) |
| *H04W 52/36* | (2009.01) |

(52) U.S. Cl.
CPC ........ *H04W 52/52* (2013.01); *H04B 7/15535* (2013.01); *H04W 24/08* (2013.01); *H04W 52/245* (2013.01); *H04W 52/367* (2013.01)

(58) Field of Classification Search
CPC ... H04B 7/155; H04B 7/15535; H04W 24/08; H04W 52/24; H04W 52/245; H04W 52/36; H04W 52/367
See application file for complete search history.

(56) References Cited

U.S. PATENT DOCUMENTS

| | | | | |
|---|---|---|---|---|
| 5,204,970 | A * | 4/1993 | Stengel | H04W 52/146 455/63.1 |
| 6,430,418 | B1 * | 8/2002 | Nivens | H04B 7/18513 455/12.1 |
| 7,924,751 | B2 * | 4/2011 | Dean | H04B 7/15535 370/279 |

(Continued)

FOREIGN PATENT DOCUMENTS

| | | | | |
|---|---|---|---|---|
| EP | 1783926 A2 * | 5/2007 | | H04B 7/14 |
| EP | 1783926 B1 * | 3/2010 | | H04W 52/46 |

*Primary Examiner* — Hai V Nguyen

(57) ABSTRACT

Provided is a method of power control, repeater and storage medium. The repeater is used to amplify cellular communication signals between a base station and a user equipment. The method includes measuring a power of downlink signals received from the base station; estimating a power of uplink signals transmitted from the user equipment, wherein the power of uplink signals is estimated based on the measured power of downlink signals and a power constant, and the power constant is an estimated closed-loop power control constant between the power of downlink signals and the power of uplink signals; and determining a power of uplink signals transmitted to the base station, based on the estimated power of uplink signals. In this method, AGC (Auto Gain Control) can respond quickly and properly, thereby reducing the false response of AGC and improving the repeater performance.

19 Claims, 3 Drawing Sheets

(56) References Cited

U.S. PATENT DOCUMENTS

| | | | |
|---|---|---|---|
| 8,369,377 B2* | 2/2013 | Michaels | H04J 13/0018 |
| | | | 375/260 |
| 8,665,774 B2* | 3/2014 | Dean | H04W 52/14 |
| | | | 370/492 |
| 10,236,968 B2* | 3/2019 | Alex | H04W 52/262 |
| 11,233,492 B2* | 1/2022 | Ashworth | H04B 7/15535 |
| 11,601,103 B2* | 3/2023 | Snell | H03G 3/005 |
| 11,637,622 B2* | 4/2023 | Kim | H04B 7/15557 |
| | | | 370/279 |
| 11,848,654 B2* | 12/2023 | Ashworth | H04W 16/26 |
| 12,150,201 B2* | 11/2024 | Park | H04W 52/0258 |
| 2003/0123401 A1* | 7/2003 | Dean | H04B 7/15535 |
| | | | 370/318 |
| 2005/0232194 A1* | 10/2005 | Hanna | H04B 7/15535 |
| | | | 370/503 |
| 2005/0254442 A1* | 11/2005 | Proctor, Jr. | H04B 7/1555 |
| | | | 370/294 |
| 2007/0268846 A1* | 11/2007 | Proctor, Jr. | H04B 7/15535 |
| | | | 370/279 |
| 2011/0019719 A1* | 1/2011 | Michaels | H04J 13/0018 |
| | | | 375/142 |
| 2011/0305172 A1* | 12/2011 | Dean | H04B 7/15535 |
| | | | 370/279 |
| 2012/0315894 A1* | 12/2012 | Dussmann | H04B 7/15535 |
| | | | 455/424 |
| 2016/0014705 A1* | 1/2016 | Tani | H04B 1/1036 |
| | | | 370/252 |
| 2017/0134085 A1* | 5/2017 | Dussmann | H04B 7/15528 |
| 2018/0054251 A1* | 2/2018 | Alex | H04B 7/18506 |
| 2020/0389142 A1* | 12/2020 | Ashworth | H03F 3/245 |
| 2020/0389228 A1* | 12/2020 | Ashworth | H04B 7/15535 |
| 2021/0058048 A1* | 2/2021 | Snell | H01P 3/06 |
| 2021/0359748 A1* | 11/2021 | Kim | H04W 56/001 |
| 2022/0369417 A1* | 11/2022 | Park | H04W 52/0258 |
| 2022/0377573 A1* | 11/2022 | Ashworth | H04W 16/26 |
| 2023/0103606 A1* | 4/2023 | Lee | H04W 8/24 |
| | | | 370/329 |
| 2023/0198730 A1* | 6/2023 | Gutman | H04W 52/245 |
| | | | 370/278 |
| 2023/0354340 A1* | 11/2023 | Su | H04L 5/0012 |
| 2024/0073832 A1* | 2/2024 | Lee | H04W 24/08 |

\* cited by examiner

100

110 — measuring a power of downlink signals received from the base station

120 — estimating a power of uplink signals transmitted from the user equipment, wherein the power of uplink signals is estimated based on the measured power of downlink signals and a power constant 130 — determining a power of uplink signals transmitted to the base station, based on the estimated power of uplink signals

FIG. 4

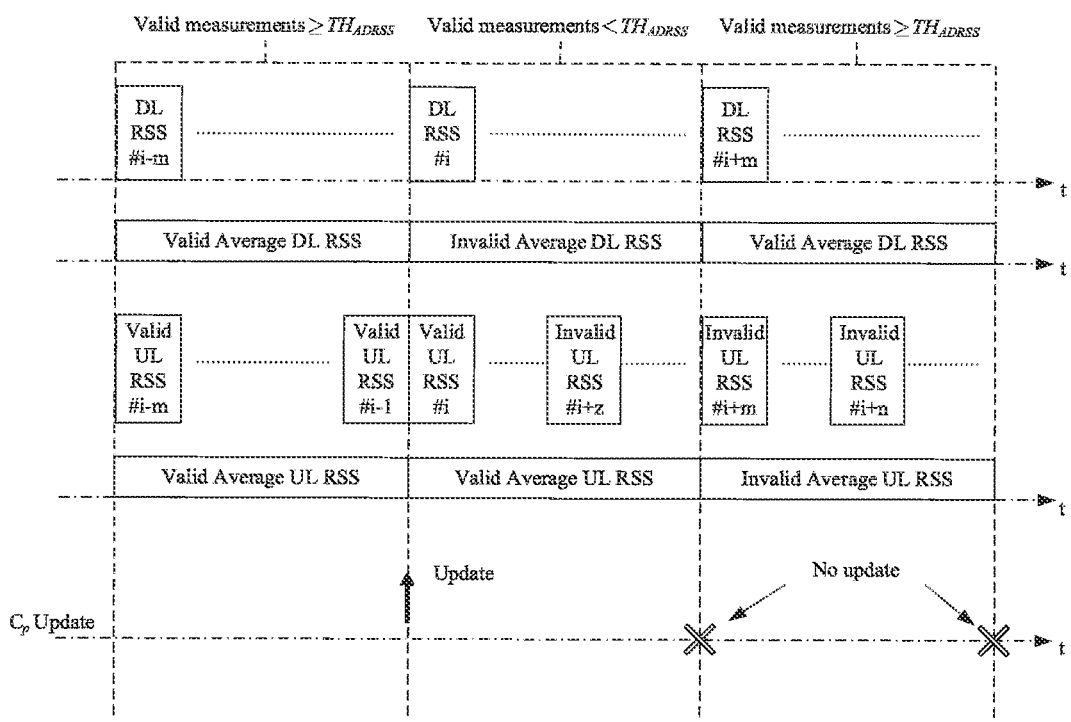

FIG. 5

METHOD OF POWER CONTROL, REPEATER AND STORAGE MEDIUM

CROSS REFERENCE TO RELATED APPLICATION

This application claims the benefit of priority under 35 USC § 119(e) of U.S. Provisional Patent Application No. 63/401,112, filed on Aug. 25, 2022, the contents of which are incorporated by reference as if fully set forth herein in their entirety.

TECHNICAL FIELD

The present application relates to wireless communication technologies, and more particularly to a method of power control, a repeater and a storage medium.

BACKGROUND

In wireless communication systems, signals are exchanged between a base station (e.g., a cell tower, or gNB in 5G NR (New Radio)) and one or more mobile terminals or user equipments (UEs). The base station can provide services within a coverage area, which may be expanded by a use of repeaters. The repeaters can improve the quality of wireless communication by receiving, filtering, amplifying and re-transmitting the signals communicated between the base station and the one or more UEs in both an uplink direction (i.e., from the UE to the base station) and a downlink direction (i.e., from the base station to the UE).

The repeater can receive downlink signals from the base station via the repeater's Donor antenna mounted externally or internally, amplify the downlink signals and then provide amplified downlink signals to the UE via the repeater's Service antenna such that the UE can receive stronger signals from the base station. On the contrary, uplink signals from the UE are directed to the repeater and amplified by the repeater before sent to the base station. In other words, the repeater acts as a RF (Radio Frequency) signal relay between the base station and the UE.

For a repeater, it typically consists of multiple gain stages. Generally speaking, these gain stages can be grouped as Rx Gain and Tx Gain. The total gain of the repeater may be considered as a sum of Rx Gain and Tx Gain. The design principle of Rx Gain is to have the (sub-)optimal reception quality for the following signal processing, while Tx Gain is to make sure the HPA (High Power Amplifier) is working in the linear range all the time. The control of Rx Gain is achieved by AGC (Auto Gain Control), while the control of Tx Gain is by ALC (Auto Level Control). The working principle of AGC and ALC is based on the RSS (Received Signal Strength) measurement. That is, the control of Rx Gain and Tx Gain is determined according to the RSS measured by the repeater. As a result, the measurement duration is an important topic, where careful design is required. If the duration is too short, the measured power is pretty variant due to PAPR (Peak to Average Power Ratio). On the other hand, if the duration is too long, the measured power would be unable to meet the requirement of dynamic response. Basically, it is designed that the measurement duration is more than one symbol (e.g., OFDM (Orthogonal Frequency Division Multiplexing) symbol) and the control period of AGC and ALC is frame-based, where one frame consists of a certain number of symbols. For an analog repeater, the Tx Gain is usually fixed and, hence, AGC should keep the Rx Gain as fixed as possible so that the total repeater gain can be a fixed value. For a digital repeater, both the Rx and Tx gains are, however, configurable. Therefore, synchronization of the two control loops is very important for the digital repeater to maintain a fixed value for the total repeater gain.

In practice, the received signal strength (RSS) at a repeater receiver is varied in the field. Therefore, an appropriate RSS hysteresis range is usually defined for AGC to control the Rx Gain to effectively reduce the Rx Gain fluctuations due to the varied received power. When RSS is within the hysteresis range, the Rx Gain remains fixed. Moreover, when RSS is above or below the hysteresis range, the Rx Gain is decreased or increased in pre-defined steps, respectively.

For UL signals, they are usually burst type in the UL time slots of a radio frame, which means the UL transmission is not continuous (Dis-continuous Transmission, DTX). The time interval between two DTXs is sometimes too long compared to the control period of AGC. Moreover, the power of DTX is too high compared to the background noise. As a result, the AGC cannot respond properly, and the repeater performance is severely degraded.

SUMMARY

The objective of the present application is to provide a method of power control, a repeater and a storage medium, for solving the problems in the existing arts to reduce the false response of AGC (Auto Gain Control, i.e., the control of Rx Gain), especially for burst-type signals.

To achieve above objective, in an aspect, the present application provides a method of power control for a repeater, in which the repeater is used to amplify cellular communication signals between a base station and a user equipment, the method comprising: measuring a power of downlink signals received from the base station; estimating a power of uplink signals transmitted from the user equipment, wherein the power of uplink signals is estimated based on the measured power of downlink signals and a power constant, and the power constant is an estimated closed-loop power control constant between the power of downlink signals and the power of uplink signals; and determining a power of uplink signals transmitted to the base station, based on the estimated power of uplink signals.

In another aspect, the present application provides a repeater, used to amplify cellular communication signals between a base station and a user equipment, the repeater comprising: a Rx circuit; a Tx circuit; and a controller, coupled to the Rx circuit and the Tx circuit, the controller being configured to: measure a power of downlink signals received from the base station; estimate a power of uplink signals transmitted from the user equipment, wherein the power of uplink signals is estimated based on the measured power of downlink signals and a power constant, and the power constant is an estimated closed-loop power control constant between the power of downlink signals and the power of uplink signals; and determine a power of uplink signals transmitted to the base station, based on the estimated power of uplink signals.

In still another aspect, the present applicant provides a non-transitory machine-readable medium, comprising a plurality of instructions, when executed by a machine, the instructions cause the machine to perform the afore-described method of power control.

Above all, the present application provides the method of power control, the repeater and the storage medium as described above. In this repeater power control method, the power of uplink signals transmitted from the user equipment is estimated based on the measured power of downlink signals received from the base station and the power constant, and the power of uplink signals transmitted to the base station is determined based on the estimated power of uplink signals. Since the power of uplink signals (which would be burst-type signals) from the user equipment is estimated from the downlink signals received in advance other than a measured power of uplink signals, the AGC (Auto Gain Control, i.e., the control of Rx Gain) can respond quickly and properly, thereby reducing the false response of AGC and improving the repeater performance.

BRIEF DESCRIPTION OF THE DRAWINGS

FIG. 4 is a flowchart of a method of power control for a repeater according to some embodiments of the present application.

FIG. 5 is a schematic diagram illustrating an example of power constant update according to some embodiments of the present application.

DETAILED DESCRIPTION

In this document, a combination such as "at least one of A, B, or C," "one or more of A, B, or C," "at least one of A, B, and C," "one or more of A, B, and C," or "A, B, and/or C" may be A only, B only, C only, A and B, A and C, B and C, or A and B and C, where any combination may contain one or more members of A, B, or C.

In order to keep a repeater transparent to the mobile network, the repeater has to operate with a fixed linear gain. In this document, Adaptive Repeater Gain Control (ARGC) is proposed to achieve the goal.

To reduce the false response of AGC (Auto Gain Control, i.e., the control of Rx Gain), especially for burst-type signals, this application provides a method of power control, a repeater and a storage medium.

In the present invention, the power of uplink signals (which would be burst-type signals) transmitted from a user equipment (e.g., a mobile terminal) to the repeater is estimated based on a measured power of downlink signals received by the repeater from a base station (e.g., a cell tower, or gNB in 5G NR) and a power constant. Based on the estimated power of uplink signals, the repeater determines the power of uplink signals transmitted to the base station. In this way, the AGC of the repeater will respond quickly and properly because the power of uplink signals from the user equipment is estimated from the downlink signals received in advance other than a measured power. Therefore, this invention can reduce the false response of AGC, thereby improving the repeater performance.

Figure 1:
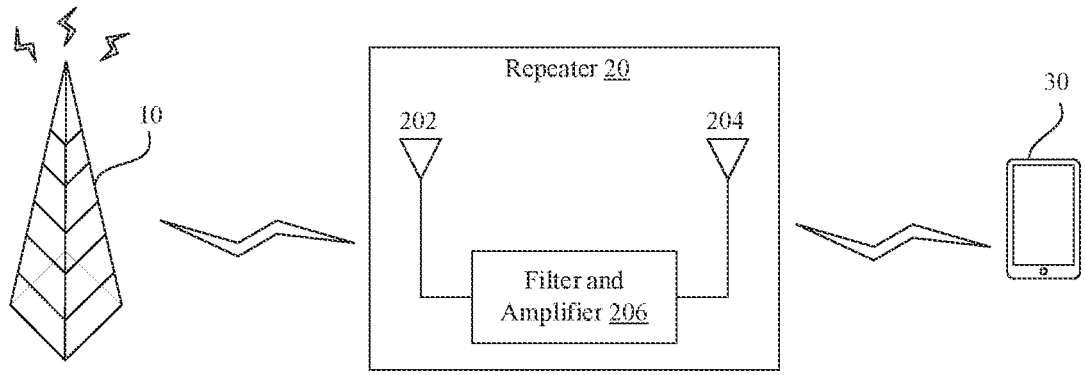
FIG. 1 is a schematic diagram illustrating an exemplary repeater in communication with a base station and a user equipment.

FIG. 1 illustrates an exemplary repeater 20 in communication with a base station 10 and a user equipment (UE) 30. The repeater 20, arranged between the base station 10 and the user equipment 30, can improve the quality of wireless communication by receiving, filtering, amplifying and retransmitting the signals (more specifically, cellular communication signals) communicated between the base station 10 and the user equipment 30 in both an uplink direction (i.e., from the UE 30 to the base station 10) and a downlink direction (i.e., from the base station 10 to the UE 30). Although illustrated by only one user equipment, the repeater 20 may serve more than one user equipments. The repeater 20 may be arranged at a fixed location, such as in a room of a building, or be mounted to a movable object, such as a vehicle.

The repeater 20 may include a donor antenna 202, a filter and amplifier 206 and a service antenna 204. The donor antenna 202 may be mounted externally or internally at a suitable location for receiving downlink signals from the base station 10. The downlink signals are provided to the filter and amplifier 206 to be filtered and amplified based on gain control, and the resulting signals are then provided to the service antenna 204, which can wirelessly communicate the resulting signals to the user equipment 30. In this way, the user equipment 30 can receive stronger signals from the base station 10.

The service antenna 204 may receive uplink signals from the user equipment 30. The uplink signals are provided to the filter and amplifier 206 to be filtered and amplified based on the repeater power control method of this application, and the resulting signals are then provided to the donor antenna 202, which can wirelessly communicate the resulting signals to the base station 10. In this way, the base station 10 can receive the signals from the user equipment 30 that may be located outside of the coverage area of the base station 10.

Figure 2:
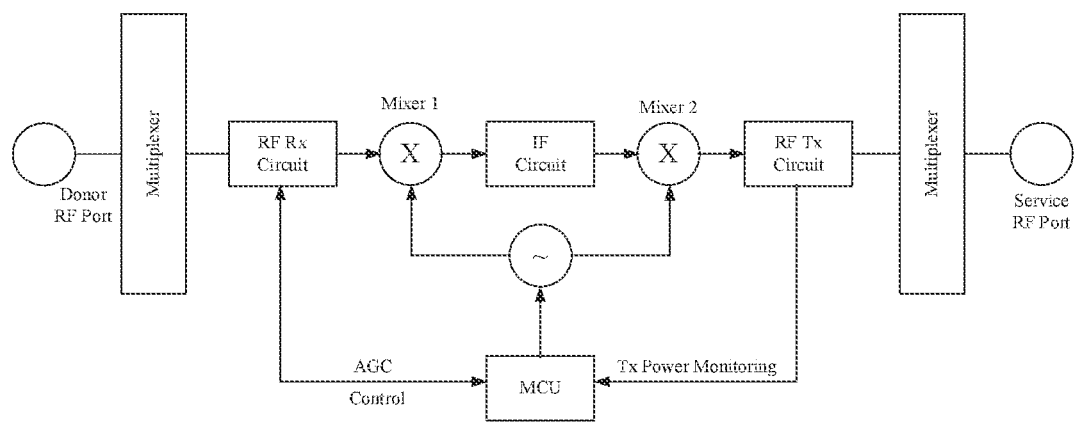
FIG. 2 is a block diagram illustrating an analog FDD repeater according to some embodiments of the present application.
Figure 3:
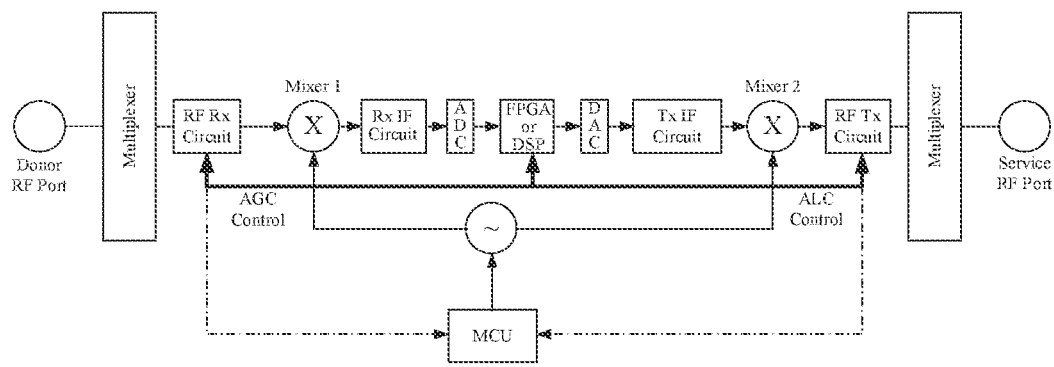
FIG. 3 is a block diagram illustrating a digital FDD repeater according to some embodiments of the present application.

FIG. 2 illustrates an analog frequency division duplex (FDD) repeater, while FIG. 3 illustrates a digital FDD repeater. The invention can be implemented not only by the analog FDD repeater and the digital FDD repeater illustrated in FIG. 2 and FIG. 3 respectively, but also by other types of repeaters, such as an analog time division duplex (TDD) repeater, a digital TDD repeater, or a hybrid repeater with mixed analog and digital circuits. It should be noted that the repeaters shown in FIG. 2 and FIG. 3 are illustrated exemplarily in a DL configuration; however, it is straightforward to derive a UL configuration for the repeaters. As a result, the UL configuration is omitted for simplicity of description.

As shown in FIG. 2 and FIG. 3, the repeater includes a radio frequency (RF) Rx circuit, an RF Tx circuit and a microcontroller (MCU). In one circuit configuration, for DL signals, the RF Rx circuit may be coupled to a donor RF port (via a multiplexer) which is used to connect to a donor antenna for receiving downlink signals from the base station, and the RF Tx circuit may be coupled to a service RF port (via a multiplexer) which is used to connect to a service antenna for transmitting the downlink signals to the user equipment. In another circuit configuration, for UL signals, the RF Rx circuit may be coupled to the service antenna for receiving uplink signals from the user equipment, and the RF Tx circuit may be coupled to the donor antenna for transmitting the uplink signals to the base station. The MCU coupled to the RF Rx circuit and the RF Tx circuit is configured to control Rx Gain of the RF Rx circuit and Tx Gain of the RF Tx circuit. The total gain of the repeater is considered as a sum of Rx Gain and Tx Gain. The control of Rx Gain is achieved by AGC (Auto Gain Control), while the control of Tx Gain is by ALC (Auto Level Control). For the analog repeater depicted in FIG. 2, the Tx Gain is usually fixed and thus, the control of the total gain of the analog repeater is mainly achieved by controlling the Rx Gain by AGC. For the digital repeater depicted in FIG. 3, both the Rx Gain and the Tx gain are configurable, and thus the control of the total gain of the digital repeater is achieved by controlling the Rx Gain by AGC and controlling the Tx Gain by ALC. Synchronization of the two control loops is necessary for the digital repeater.

As depicted in FIG. 2, the analog repeater includes an intermediate frequency (IF) circuit used to generate IF signals, and two mixers (i.e., Mixer 1 and Mixer 2) for frequency mixing with carrier frequency, for example. Different from the analog repeater depicted in FIG. 2, instead of the IF circuit arranged between the two mixers, the digital repeater depicted in FIG. 3 includes a Rx IF circuit, an analog-to-digital circuit (ADC), a field programmable gate array (FPGA) or digital signal processor (DSP) chip, a digital-to-analog circuit (DAC) and a Tx IF circuit located between the two mixers. The digital repeater performs digital signal processing by using the afore-mentioned circuit elements.

Ideally, the goal of deploying a repeater is to make the UEs in the coverage area of the repeater appear to be at the Donor antenna. Therefore, it is inevitable to use the repeater gain to compensate for the path loss between the Service antenna and the UE in service. The path loss from the base station to the UE would be considered as being approximate to the path loss from the base station to the Donor antenna. Based on this argument, the uplink (UL) gain should follow the downlink (DL) gain. Furthermore, based on the closed-loop power control principle, when a UE receives a weaker DL signal, the UE will transmit higher UL power, and vice versa. So, it is possible to predict or estimate the UL receiving power representative of UL RSS (Received Signal Strength) at Service antenna that the repeater will receive based on the DL receiving power representative of DL RSS that it detected at Donor antenna. Next, it is analyzed how Donor antenna gain and co-channel interference on Donor side affect the UL RSS that the repeater should receive.

This can be intuitively seen from the purpose of the power control rules, which is to equalize the power at the base station and compensate for varying distances between the base station and the mobile stations (e.g., user equipments). Based on the power control rules, one can generally infer that if the received signal strength indicator (RSSI) of the downlink signals transmitted by the base station is high, then the distance between the mobile station and the base station can be presumed to be small, thus the mobile station can be expected to transmit a lower power back to the base station on the uplink to compensate for their relatively close proximity. Conversely, one can infer that if the RSSI of the downlink signals is low, then it can be presumed that the mobile station and the base station are far apart, and thus the mobile station can be expected to transmit a higher power back to the base station on the uplink to compensate for the greater distance.

First, the difference of Donor antenna gain may be due to the use of different antennas or different steering angles of the same antenna. The following Equations (1) and (2) are from UE's perspective. Accordingly, one can derive formulas (3) and (4) for the UL RSS detected by the repeater. It can be observed that even at different Donor antenna gains, it still follows the closed-power control principle and, hence, the UL RSS that the repeater should receive is still predictable based on the detected DL RSS.

$$P_{DL} + G_{Ant1} + G_D - PL_D + P_{UETx1} = \qquad (1)$$
$$DL\ RSS_1 + G_D - PL_D + P_{UETx1} = C$$
$$P_{DL} + G_{Ant2} + G_D - PL_D + P_{UETx2} = \qquad (2)$$
$$DL\ RSS_2 + G_D - PL_D + P_{UETx2} = C$$
$$UL\ RSS_1 =$$
$$P_{UETx1} - PL_U = (C - G_D + PL_D - PL_U) - DL\ RSS_1 = C' - DL\ RSS_1$$
$$UL\ RSS_2 =$$
$$P_{UETx2} - PL_U = (C - G_D + PL_D - PL_U) - DL\ RSS_2 = C' - DL\ RSS_2$$

where $P_{DL}+G_{Ant1}=DL\ RSS_1$ and $P_{DL}+G_{Ant2}=DL\ RSS_2$ are the DL powers detected by the repeater on Donor side for different donor antenna gains; $G_D$ is the DL repeater gain; $PL_D$ and $PL_U$ are the path loss from Service antenna to the UE, and vice versa; $P_{UETx}$ denotes the UL power transmitted by the UE; C and C' are two constants, where C is further determined by closed power control.

The DL power received at UE can be represented by DL $RSS+G_D-PL_D$. Based on the closed-power control principle, the sum of the DL power received at UE and the UL power transmitted by the UE would be presumed to be a constant, that is, $DL\ RSS_1+G_D-PL_D+P_{UETx1}=C$, such that Equations (1) and (2) are obtained. To derive the UL RSS detected by the repeater, Equation (3) is derived based on the result from Equation (1) while Equation (4) is derived based on the result from Equation (2). It can be seen that the Equations (3) and (4) show that the UL RSS that the repeater should receive is predictable based on the detected DL RSS. As a result, one can estimate the UL receiving power of the repeater, representative of the UL RSS, based on the DL receiving power of the repeater, representative of the DL RSS.

Second, the co-channel interference is due to the multipaths from adjacent cells. Although the installation of base stations is pre-planned, co-channel interference will be inevitably introduced on site. Considering the co-channel interference, Equations (1) and (3) may be further modified as follows.

$$P_{DL} + G_{Ant} + G_D - PL_D + P_{UETx} =$$
$$(DL\ RSS - P_{co}) + G_D - PL_D + P_{UETx} = C,$$
$$UL\ RSS = P_{UETx} - PL_U =$$
$$(C - G_D + PL_D - PL_U + P_{co}) - DL\ RSS = C' + P_{co} - DL\ RSS,$$

where $P_{co}$ denotes the co-channel interference power received on Donor side.

From (5), it can be observed that UL RSS can be predicted only when $P_{co}$ is fairly stable. This assumption should be, however, easily satisfied since the Donor antenna is usually installed at a location, where the DL RSS variation is less than 3 dB. So, based on the above derivation, an estimated UL receiving power of the repeater (e.g., estimated UL RSS) can be obtained.

FIG. 4 is a flowchart of a method 100 of power control for a repeater according to some embodiments of the present application. The repeater is used to amplify cellular communication signals between a base station (e.g., gNB) and a user equipment (UE). The exemplary structure of the repeater may be referred to FIGS. 1 to 3. The repeater power control method 100 may be implemented in the MCU depicted in FIGS. 2 and 3. The method 100 includes the following steps.

It is noted that the invention is to reduce the false response of AGC of the repeater on the uplink signals (which would be burst-type signals). Traditionally, the repeater determines the gain of the uplink signals based on a measured power of the uplink signals. Different from the traditional technique, the invention proposes the method to determine the gain of the uplink signals based on an estimated power of the uplink signals. The estimated power is calculated based on a measured power of downlink signals.

Step 110: measuring a power of downlink signals received from the base station.

In this step, the repeater receives downlink signals from the base station and measures the power of the downlink signals. The measured power (or power level) of downlink signals can be represented by DL RSS detected by the repeater. The DL RSS can be the DL power detected by the repeater on Donor side with a donor antenna gain taken into account. It is noted that if a burst-type uplink signal is coming, its corresponding power of downlink control signal would be changed. In order to determine the power of uplink signals transmitted to the base station, the measured power of downlink signals may be taken into consideration to achieve fast gain response of the repeater.

Step 120: estimating a power of uplink signals transmitted from the user equipment, wherein the power of uplink signals is estimated based on the measured power of downlink signals and a power constant.

In this step, the power of uplink signals transmitted from the user equipment is estimated based on the measured power of downlink signals and a power constant, where the power constant is an estimated closed-loop power control constant between the power of downlink signals and the power of uplink signals, and the power constant can be updated based on measured power of downlink signals (e.g., DL RSS) and measured power of uplink signals (e.g., UL RSS).

Every time when a valid DL RSS is output by Rx power detector, the estimated UL RSS can be obtained by the following formula:

UL RSS Estimate=$C_p$−DL RSS where $C_p$ represents the power constant, which is configurable and is the estimated closed-loop power control constant between UL RSS and DL RSS. A valid DL RSS means the DL RSS will not trigger DL ALC of the repeater. It is noted that the estimated UL RSS does not imply that the repeater will always receive such UL power, but depends on the UL resources allocated for the UE in service.

In some embodiments, the power constant $C_p$ may be updated. Specifically, the power constant $C_p$ may be updated based on an average power of downlink signals and an average power of uplink signals that are calculated within an estimate period. As a result, the subsequent power of uplink signals is estimated based on the measured power of downlink signals and the updated power constant. In some embodiments, the power constant is updated only if both the average power of downlink signals and the average power of uplink signals are valid within the estimate period.

The power constant update is described as follows:
(1) During an estimate period $T_{est}$, calculate the average DL RSS that is detected on Donor side, where the estimate period $T_{est}$ is configurable and is the period to measure UL RSS, and $T_{est}$ may be a multiple of the Rx power measurement periods and aligned with the power measurement output. It is noted that only valid DL RSS measurements are included in the average, and a DL RSS measurement is considered valid only when the DL ALC does not trigger. In one embodiment, if the number of invalid DL RSS exceeds a certain value within a certain $T_{est}$, the calculated average DL RSS is considered invalid and $C_p$ is not updated for that $T_{est}$. In another embodiment, if the number of valid DL RSS exceeds a threshold within a certain $T_{est}$, the calculated average DL RSS is considered valid and $C_p$ is updated for that $T_{est}$. The threshold may be called a valid average DL RSS threshold $TH_{ADRSS}$, which is configurable and is the minimum number of valid DL RSS measurements within one $T_{est}$.

(2) During the estimate period $T_{est}$, calculate the average UL RSS that is detected on Service side. It is noted that only valid UL RSS measurements are included in the average, and a UL RSS measurement is considered valid only when it is higher than a UL RSS threshold $RSS_{UTH}$ and UL ALC does not trigger. The UL RSS threshold $RSS_{UTH}$ is configurable and is the minimum threshold to determine if the detected UL RSS is to be included in the average or not.

(3) When both the average DL RSS and average UL RSS are updated, the power constant Cp is updated according to the following formula:

$C_p$=Average DL RSS+Average UL RSS

FIG. 5 illustrates an example of power constant $C_p$ update, where the power constant $C_p$ is updated only if both the average DL RSS and the average UL RSS are valid. As illustrated in FIG. 5, if any of the average DL RSS and the average UL RSS is invalid, the power constant $C_p$ will not be updated. This is to ensure the estimated UL RSS is obtained based on a more reliable estimated power constant, avoiding leading to a false response of the repeater.

Step 130: determining a power of uplink signals transmitted to the base station, based on the estimated power of uplink signals.

In this step, the power of uplink signals that will be used to transmit the uplink signals to the base station is determined. Assuming that an uplink gain of the repeater is known, the output power of the repeater (i.e., the power of uplink signals transmitted to the base station) can be calculated by multiplying the input power of the repeater (i.e., the estimated power of uplink signals, that is, estimated UL RSS) by the uplink gain. In this way, the repeater knows how much power (or power level) is to be used to transmit the uplink signals to the base station. For an analog repeater, the uplink gain may be determined by uplink Rx Gain only because uplink Tx Gain is usually fixed. Alternatively, for a digital repeater, uplink Tx Gain may vary. which would be the uplink gain minus uplink Rx Gain. The uplink Rx Gain may be obtained based on the estimated power of uplink signals (e.g., estimated UL RSS).

In some embodiments, an uplink gain of the repeater for the uplink signals may be determined based on a downlink gain for the downlink signals.

As mentioned above, the UL gain should follow the DL gain for the best repeater coverage performance. Therefore, UL gain is set by the following formula, where it can be observed that the UL gain is independent of the UL RSS received on Service side.

UL Gain=DL Gain−$G_{offset}$,  (6)

where UL Gain is the repeater gain set for UL forwarding, while DL Gain is the current repeater gain for DL forwarding, and the gain offset $G_{offset}$ is a configurable parameter that is used to compensate the path loss difference between DL and UL. The gain offset $G_{offset}$ is defined to offset the UL gain from the current DL gain by $G_{offset}$. If $G_{offset}=1$ dB and current DL gain=75 dB, then the UL repeater gain is set to 75−1=74 dB.

After getting the estimated UL RSS estimate, the UL Gain may be determined as follows.

In a case that only Rx AGC is involved (this case applies to an analog repeater), when a new current DL gain $G_D$ is updated, the UL gain $G_U$ may be set as follows.

If the repeater maximum UL linear power $P_{Umax}$ is not less than the maximum Tx power of a UE, then $$G_U = G_D - G_{offset}$$

If the repeater maximum UL linear power $P_{Umax}$ is less than the maximum Tx power of a UE, then $$G_U = \text{Min}\{(G_D - G_{offset}) | (P_{Umax} - \text{UL RSS})\}$$

The gain change of $G_U$ is achieved by UL Rx AGC.

In some embodiments, an uplink Rx gain may be adjusted by stepwise decrement or increment based on the estimated power of uplink signals. The uplink Rx gain is decreased in a stepwise decrement manner or is increased in a stepwise increment manner such that the estimated UL RSS plus the adjusted uplink Rx gain (which can be considered as the power amplified at Rx side) can be kept in an appropriate range. In some embodiments, an uplink Tx gain may be determined based on the uplink gain and the adjusted uplink Rx gain. The uplink gain can be considered as a sum of the uplink Rx gain and the uplink Tx gain, and thus the uplink Tx gain can be obtained based on the uplink gain and the uplink Rx gain. Further details on these embodiments are described below.

In a case that both Rx AGC and Tx ALC are involved (this case applies to a digital repeater), based on the current UL RSS estimate, which is obtained by UL RSS estimate scheme mentioned above, the UL Rx gain $G_{URx}$ may be set as:

---

If UL RSS Estimate + $G_{URx}$ > $TH_{UB}$
    $G_{URx} = \text{Max}\{G_{URx} - \Delta_D | G_{URx\_min}\}$
Else if UL RSS Estimate + $G_{URx}$ < $TH_{LB}$
    $G_{URx} = \text{Min}\{G_{URx} + \Delta_I | G_{URx\_max}\}$
Else
    $G_{URx} = G_{URx}$

--- where $G_{URx\_min}$ and $G_{URx\_max}$ denote the minimum Rx Gain and maximum Rx Gain for UL Rx, respectively, $\Delta_D$ and $\Delta_I$ denote the stepwise decrement and increment of AGC gain adjustment, respectively, and $TH_{UB}$ and $TH_{LB}$ stand for an upper bound threshold and a lower bound threshold, respectively.

When a new current DL gain $G_D$ is updated, the UL gain $G_U$ may be set as follows.

If the repeater maximum UL linear power $P_{Umax}$ is not less than the maximum Tx power of a UE, then $$G_U = G_D - G_{offset}$$

If the repeater maximum UL linear power $P_{Umax}$ is less than the maximum Tx power of a UE, then $$G_U = \text{Min}\{(G_D - G_{offset}) | (P_{Umax} - \text{UL RSS})\}$$

Then, UL Tx gain $G_{UTx}$ is set as follows.

$$G_{UTx} = G_U - G_{URx}$$

The present application provides the method of power control as described above. In this repeater power control method, the power of uplink signals transmitted from the user equipment is estimated based on the measured power of downlink signals received from the base station and the power constant, and the power of uplink signals transmitted to the base station is determined based on the estimated power of uplink signals. If a burst-type signal is coming, its corresponding power of downlink control signal would be changed. Accordingly, the measured power of downlink signals may be considered in determining the gain of uplink signals. In the invention, since the power of uplink signals (which would be burst-type signals) from the user equipment is estimated from the downlink signals received in advance other than a measured power of uplink signals, the AGC (Auto Gain Control, i.e., the control of Rx Gain) can respond quickly and properly, thereby reducing the false response of AGC and improving the repeater performance.

Ideally, the Donor antenna of a repeater should be installed in a position, where the DL RSS is relatively stable, say the RSS variation is within 3 dB. However, this is impractical in the real world, especially when the base station (BS) loading, namely radio resource utilization, is variant with time. Generally speaking, when the BS loading is getting heavier, the effective coverage area of the BS is getting smaller. On the contrary, the effective coverage area of the BS is getting larger when the BS loading is getting lighter. This is called cell breathing effect and causes the RSS within the coverage to vary by up to 8 dB. It also means that the RSS at the repeater's Donor antenna will vary equally. As a result, the repeater sometimes operates within the ALC range (that is, at the time the output transmit power is limited by the ALC since the output transmit power cannot be increased without a limit), which means the repeater gain is no longer always fixed. Traditionally, the field engineer would keep a fixed margin such as 8 dB of the repeater gain at commissioning to account for this issue (that is, this will lead to a smaller repeater gain all the time). However, the RSS variation due to cell breathing is never a fixed number but depends on the cell loading. As a result, an adaptive DL gain backoff scheme is proposed below to optimize the overall performance of a repeater with respect to the DL RSS variation at Donor antenna.

In some embodiments, based on above analysis, the repeater power control method 100 may further include a step of determining a downlink gain for the downlink signals based on a gain obtained by backing off a downlink maximum gain by a backoff gain. That is, the DL gain of the repeater may be obtained by backing off a set DL maximum gain by a DL backoff gain. Different from the traditional technique where DL backoff gain is fixed to a value such as 8 dB, the DL backoff gain of this embodiment is changeable or updatable, that is, the DL backoff gain is a variable. The value of this variable may depend on the BS loading. One can expect that a larger DL backoff gain may be obtained in the case of a lighter BS loading, and a smaller DL backoff gain may be obtained in the case of a heavier BS loading.

The DL backoff gain $G_{backoff}$ is configurable and is defined to backoff the set DL maximum gain $G_{Dmax\_set}$ by $G_{backoff}$. For example, if $G_{backoff}=5$ dB and $G_{Dmax\_set}=75$ dB, then the DL repeater gain is set to 75−5=70 dB. A gain backoff period $T_{backoff}$ may be defined, which is configurable and is the period to update the value of $G_{backoff}$. For example, $T_{backoff}$ is frame-based, say 1 second, which means $G_{backoff}$ is updated per 1 second. The new $G_{backoff}$ valid timing may have to be aligned with AGC control timing and there is no UL traffic to prevent from degrading the repeating performance due to repeater gain change.

In some embodiments, the downlink gain for the downlink signals is a minimum of the downlink maximum gain ($G_{Dmax\_set}$) minus the backoff gain ($G_{backoff}$), and a maximum output power (which may be denoted as $P_{Dmax}$) minus the measured power of downlink signals (e.g., DL RSS). Setting the minimum of the afore-described two gain values as the DL repeater gain is to try to avoid the repeater from operating within the ALC range (that is, at the time the output transmit power is limited by the ALC since the output transmit power cannot be increased without a limit). Further details on this feature are described below.

In a case that only Rx AGC is involved (this case applies to an analog repeater), based on above description, when a new DL RSS measurement result is output by AGC power detector, the DL gain $G_D$ is set as follows:

$$G_D=\text{Min}\{(G_{Dmax\_set}-G_{backoff})|(P_{Dmax}-\text{DL RSS})\}$$

In this case, the gain change of $G_D$ is achieved by DL Rx AGC.

In some embodiments, a downlink Rx gain may be adjusted by stepwise decrement or increment based on the measured power of downlink signals. The downlink Rx gain is decreased in a stepwise decrement manner or is increased in a stepwise increment manner such that the measured DL RSS plus the adjusted downlink Rx gain (which can be considered as the power amplified at Rx side) can be kept in an appropriate range. In some embodiments, a downlink Tx gain may be determined based on the determined downlink gain and the adjusted downlink Rx gain. The downlink gain can be considered as a sum of the downlink Rx gain and the downlink Tx gain, and thus the downlink Tx gain can be obtained based on the downlink gain and the downlink Rx gain. Further details on these embodiments are described below.

In a case that both Rx AGC and Tx ALC are involved (this case applies to a digital repeater), when a new DL RSS measurement result is output by AGC power detector, the DL Rx gain $G_{DRx}$ is set by AGC algorithm as follows:

If DL RSS + $G_{DRx}$ > $TH_{UB}$
   $G_{DRx}$ = Max{$G_{DRx}$ − $\Delta_D$ | $G_{DRx\_min}$}
Else if DL RSS + $G_{DRx}$ < $TH_{LB}$
   $G_{DRx}$ = Min{$G_{DRx}$ + $\Delta_I$ | $G_{DRx\_max}$}
Else
   $G_{DRx}$ = $G_{DRx}$ where $G_{DRx\_min}$ and $G_{DRx\_max}$ denote the minimum Rx Gain and maximum Rx Gain for DL Rx, respectively, $\Delta_D$ and $\Delta_I$ denote the stepwise decrement and increment of AGC gain adjustment, respectively, and $TH_{UB}$ and $TH_{LB}$ stand for an upper bound threshold and a lower bound threshold, respectively.

Then, in this case, DL Tx gain $G_{DTx}$ is set as follows.

$$G_D=\text{Min}\{(G_{Dmax\_set}-G_{backoff})|(P_{Dmax}-\text{DL RSS})\}$$

$$G_{DTx}=G_D-G_{DRx}$$

In some embodiments, the backoff gain $G_{backoff}$ is updated. Specifically, the backoff gain $G_{backoff}$ may be updated based on the measured power of downlink signals (e.g., DL RSS). More specifically, the backoff gain $G_{backoff}$ is updated based on a peak of the measured power of downlink signals (e.g., DL RSS).

The backoff gain update is described as follows:

(1) When the gain backoff period $T_{backoff}$ expires, the DL backoff gain $G_{backoff}$ is updated based on the DL RSS measurements output by AGC power detector. Record the max DL RSS, namely $RSS_{Dmax}$ that AGC power detector has been detected in the past $T_{backoff}$. Then, $G_{backoff}$ update formula is as follows:

$$G_{backoff}=\text{Max}\{(RSS_{Dmax}+G_{Dmax\_set}-P_{Dmax})|\Delta\},$$

where $\Delta$ is a positive number and denotes the minimum gain backoff.

It is noted that $G_{Dmax\_set}-P_{Dmax}$ is directed to a negative value of a maximum DL RSS that would be received by the repeater, and the $RSS_{Dmax}$ is a peak of current DL RSS measurements. Therefore, $RSS_{Dmax}+G_{Dmax\_set}-P_{Dmax}$ represents an allowable gain to backoff. Setting a maximum of this allowable gain to backoff and a minimum gain backoff as the DL backoff gain $G_{backoff}$ is to try to avoid the repeater from operating within the ALC range.

(2) Once $G_{backoff}$ update is finished, $T_{backoff}$ is reset and starts counting down again for the next $G_{backoff}$ update.

Figure 6:
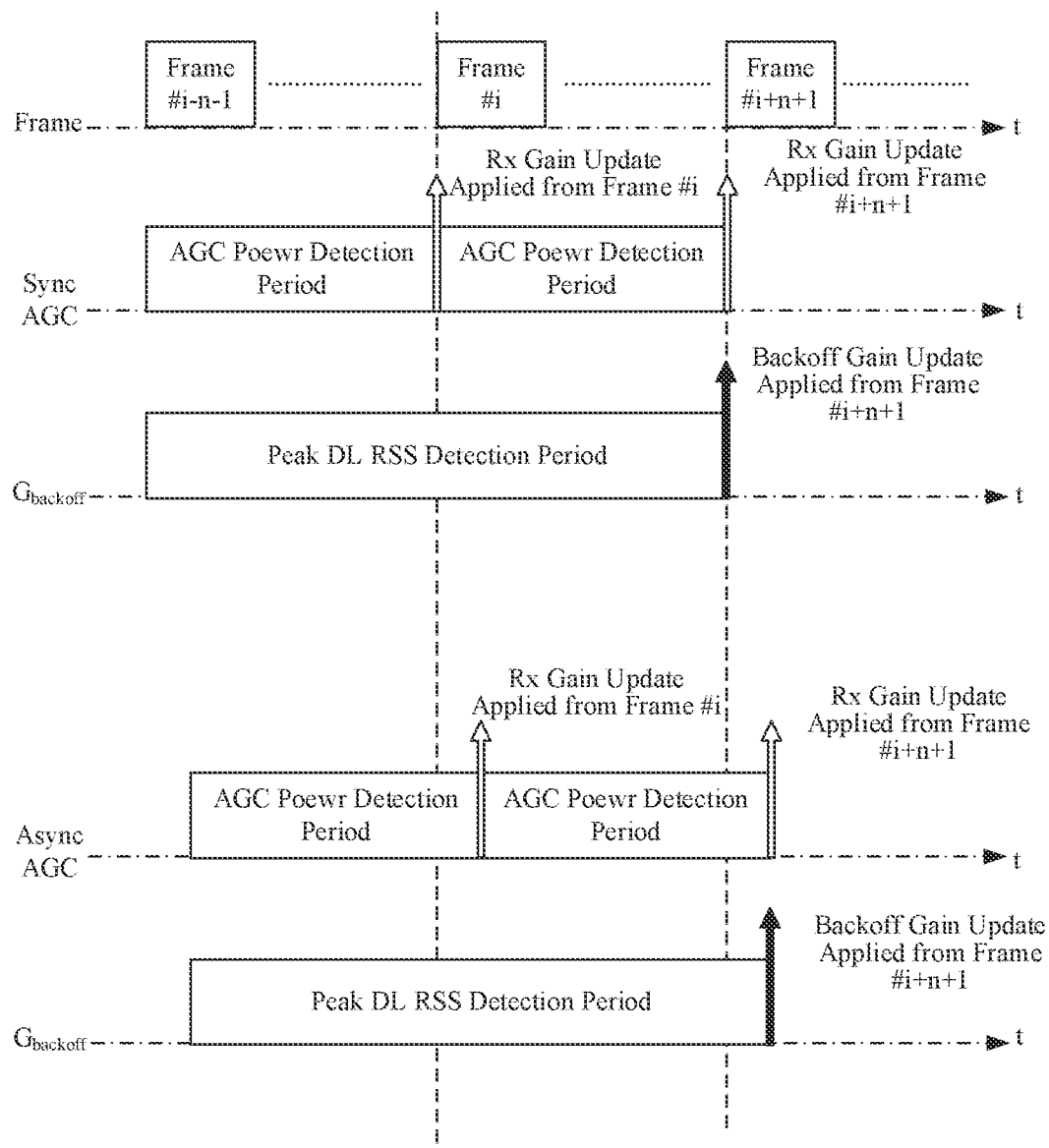
FIG. 6 is a schematic diagram illustrating a timing diagram example of AGC and backoff gain update according to some embodiments of the present application.

FIG. 6 illustrates an example of the timing diagram between Rx AGC and backoff gain update. As illustrated in FIG. 6, Rx gain update is applied at an end of AGC power detection period, while $G_{backoff}$ update is applied when the gain backoff period $T_{backoff}$ expires (i.e., at an end of peak DL RSS detection period). From this figure, it can be observed that the async AGC and associated backoff gain updates would degrade the performance of repeater as repeater gain may change during the same signal forwarding. For an FDD system, it is no way but to further decode the synchronization signals to get the frame start time for sync AGC. However, for a TDD system, the frame start time is inherently decoded to control the RF switches for the subsequent D/U forwarding and, hence, sync AGC and associated backoff gain update can be achieved without any additional work.

The embodiment of the present application further provides a repeater, used to amplify cellular communication signals between a base station and a user equipment. The repeater includes a Rx circuit; a Tx circuit; and a controller, coupled to the Rx circuit and the Tx circuit, the controller being configured to execute corresponding processes implemented in each of the methods of the embodiments of the present application. For brevity, details will not be described herein again.

The embodiment of the present application further provides a computer readable storage medium for storing a computer program. The computer readable storage medium enables a computer to execute corresponding processes implemented in each of the methods of the embodiments of the present application. For brevity, details will not be described herein again.

The embodiment of the present application further provides a computer program product including computer program instructions. The computer program product enables a computer to execute corresponding processes implemented in each of the methods of the embodiments of the present application. For brevity, details will not be described herein again.

The embodiment of the present application further provides a computer program. The computer program enables a computer to execute corresponding processes implemented in each of the methods of the embodiments of the present application. For brevity, details will not be described herein again.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

It should be understood that any embodiments disclosed herein as being "non-transitory" do not exclude any physical storage medium, but rather exclude only the interpretation that the medium can be construed as a transitory propagating signal.

Accordingly, an embodiment of the invention can include a computer readable media embodying a method of power control for a repeater. The method includes measuring a power of downlink signals received from the base station; estimating a power of uplink signals transmitted from the user equipment, wherein the power of uplink signals is estimated based on the measured power of downlink signals and a power constant, and the power constant is an estimated closed-loop power control constant between the power of downlink signals and the power of uplink signals; and determining a power of uplink signals transmitted to the base station, based on the estimated power of uplink signals. Accordingly, the invention is not limited to illustrated examples and any means for performing the functionality described herein are included in embodiments of the invention.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Above all, while the preferred embodiments of the present application have been illustrated and described in detail, various modifications and alterations can be made by persons of ordinary skill in the art. The embodiment of the present application is therefore described in an illustrative but not restrictive sense. It is intended that the present application should not be limited to the particular forms as illustrated, and that all modifications and alterations which maintain the spirit and realm of the present application are within the scope as defined in the appended claims.

What is claimed is:

1. A method of power control for a repeater, in which the repeater is used to amplify cellular communication signals between a base station and a user equipment, the method comprising:
   measuring a power of downlink signals received from the base station;
   estimating a power of uplink signals transmitted from the user equipment, wherein the power of uplink signals is estimated based on the measured power of downlink signals and a power constant, and the power constant is an estimated closed-loop power control constant between the power of downlink signals and the power of uplink signals; and
   determining a power of uplink signals transmitted to the base station, based on the estimated power of uplink signals.

2. The method according to claim 1, further comprising:
   updating the power constant based on an average power of downlink signals and an average power of uplink signals that are calculated within an estimate period,
   wherein the subsequent power of uplink signals is estimated based on the measured power of downlink signals and the updated power constant.

3. The method according to claim 2, wherein the power constant is updated only if both the average power of downlink signals and the average power of uplink signals are valid within the estimate period.

4. The method according to claim 1, further comprising:
   determining an uplink gain of the repeater for the uplink signals based on a downlink gain for the downlink signals.

5. The method according to claim 4, further comprising:
based on the estimated power of uplink signals, adjusting an uplink Rx gain by stepwise decrement or increment; and
determining an uplink Tx gain based on the determined uplink gain and the adjusted uplink Rx gain.

6. The method according to claim 1, further comprising:
determining a downlink gain for the downlink signals based on a gain obtained by backing off a downlink maximum gain by a backoff gain.

7. The method according to claim 6, wherein the downlink gain for the downlink signals is a minimum of the downlink maximum gain minus the backoff gain, and a maximum output power minus the measured power of downlink signals.

8. The method according to claim 6, further comprising:
updating the backoff gain based on the measured power of downlink signals,
wherein the backoff gain is updated based on a peak of the measured power of downlink signals.

9. The method according to claim 6, further comprising:
based on the measured power of downlink signals, adjusting a downlink Rx gain by stepwise decrement or increment; and
determining a downlink Tx gain based on the determined downlink gain and the adjusted downlink Rx gain.

10. A repeater, used to amplify cellular communication signals between a base station and a user equipment, the repeater comprising:
a Rx circuit;
a Tx circuit; and
a controller, coupled to the Rx circuit and the Tx circuit, the controller being configured to:
measure a power of downlink signals received from the base station;
estimate a power of uplink signals transmitted from the user equipment, wherein the power of uplink signals is estimated based on the measured power of downlink signals and a power constant, and the power constant is an estimated closed-loop power control constant between the power of downlink signals and the power of uplink signals; and
determine a power of uplink signals transmitted to the base station, based on the estimated power of uplink signals.

11. The repeater according to claim 10, wherein the controller is further configured to:
update the power constant based on an average power of downlink signals and an average power of uplink signals that are calculated within an estimate period,
wherein the subsequent power of uplink signals is estimated based on the measured power of downlink signals and the updated power constant.

12. The repeater according to claim 11, wherein the power constant is updated only if both the average power of downlink signals and the average power of uplink signals are valid within the estimate period.

13. The repeater according to claim 10, wherein the controller is further configured to:
determine an uplink gain of the repeater for the uplink signals based on a downlink gain for the downlink signals.

14. The repeater according to claim 13, wherein the controller is further configured to:
based on the estimated power of uplink signals, adjust an uplink Rx gain by stepwise decrement or increment; and
determine an uplink Tx gain based on the determined uplink gain and the adjusted uplink Rx gain.

15. The repeater according to claim 10, wherein the controller is further configured to:
determine a downlink gain for the downlink signals based on a gain obtained by backing off a downlink maximum gain by a backoff gain.

16. The repeater according to claim 15, wherein the downlink gain for the downlink signals is a minimum of the downlink maximum gain minus the backoff gain, and a maximum output power minus the measured power of downlink signals.

17. The repeater according to claim 15, wherein the controller is further configured to:
update the backoff gain based on the measured power of downlink signals,
wherein the backoff gain is updated based on a peak of the measured power of downlink signals.

18. The repeater according to claim 15, wherein the controller is further configured to:
based on the measured power of downlink signals, adjust a downlink Rx gain by stepwise decrement or increment; and
determine a downlink Tx gain based on the determined downlink gain and the adjusted downlink Rx gain.

19. A non-transitory machine-readable medium, comprising a plurality of instructions, when executed by a machine, the instructions cause the machine to perform the method of power control according to claim 1.

* * * * *